US008413222B1

(12) United States Patent
Cooley et al.

(10) Patent No.: US 8,413,222 B1
(45) Date of Patent: Apr. 2, 2013

(54) METHOD AND APPARATUS FOR SYNCHRONIZING UPDATES OF AUTHENTICATION CREDENTIALS

(75) Inventors: Shaun Cooley, El Segundo, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1005 days.

(21) Appl. No.: 12/163,712

(22) Filed: Jun. 27, 2008

(51) Int. Cl.
*G06F 7/04* (2006.01)
*G06F 15/16* (2006.01)
*G06F 17/30* (2006.01)
*G06F 21/00* (2006.01)
*H04L 29/06* (2006.01)

(52) U.S. Cl. ..................... 726/6; 726/7; 726/8; 713/183

(58) Field of Classification Search ....................... 726/6
See application file for complete search history.

(56) References Cited

U.S. PATENT DOCUMENTS 5,034,898 A * 7/1991 Lu et al. .......................... 706/62
5,611,048 A * 3/1997 Jacobs et al. ...................... 726/5
5,719,941 A * 2/1998 Swift et al. .................... 713/155
6,243,816 B1 * 6/2001 Fang et al. ........................ 726/5
6,418,466 B1 * 7/2002 Bertram et al. ............... 709/221
6,442,695 B1 * 8/2002 Dutcher et al. ................... 726/4
6,986,038 B1 * 1/2006 Leah et al. .................... 713/155
6,986,039 B1 * 1/2006 Leah et al. .................... 713/155
7,047,560 B2 * 5/2006 Fishman et al. ................. 726/6
7,188,181 B1 * 3/2007 Squier et al. .................. 709/228
7,251,732 B2 * 7/2007 Jamieson et al. ............. 713/182
7,260,838 B2 * 8/2007 Bones et al. ...................... 726/8
7,386,877 B2 * 6/2008 Winiger et al. ................... 726/3
7,426,642 B2 * 9/2008 Aupperle et al. ............. 713/185
7,428,750 B1 * 9/2008 Dunn et al. ....................... 726/8
7,484,206 B2 * 1/2009 Drouet et al. ................. 717/169
7,496,953 B2 * 2/2009 Andreev et al. ................... 726/8
7,530,097 B2 * 5/2009 Casco-Arias et al. ............ 726/6
7,555,771 B2 * 6/2009 Bransom et al. .................. 726/6
7,568,218 B2 * 7/2009 Garg et al. ........................ 726/4
7,725,399 B2 * 5/2010 Nakahara et al. ............... 705/57
7,765,583 B2 * 7/2010 Kalonji et al. .................... 726/4
7,860,946 B1 * 12/2010 Bulleit et al. ................. 709/218
2002/0078386 A1 * 6/2002 Bones et al. .................. 713/202
2003/0014509 A1 * 1/2003 Jurado, Jr. ..................... 709/223
2003/0074585 A1 * 4/2003 Charbonneau ................ 713/202
2004/0117666 A1 * 6/2004 Lavender et al. ............. 713/202
2004/0117667 A1 * 6/2004 Lavender et al. ............. 713/202
2005/0193080 A1 * 9/2005 Gold et al. .................... 709/208
2006/0059359 A1 * 3/2006 Reasor et al. ................. 713/182
2006/0282881 A1 * 12/2006 Johnson et al. ................... 726/4
2008/0133668 A1 * 6/2008 Laschkewitsch et al. ..... 709/205
2008/0215760 A1 * 9/2008 Song et al. .................... 709/248
2009/0260066 A1 * 10/2009 Miller et al. ...................... 726/6
2010/0077043 A1 * 3/2010 Ramarao et al. .............. 709/206
2010/0199338 A1 * 8/2010 Craddock et al. ................. 726/7

* cited by examiner

*Primary Examiner* — Carolyn B Kosowski
(74) *Attorney, Agent, or Firm* — Wilmer Cutler Pickering Hale and Dorr LLP

(57) ABSTRACT

A method and apparatus for synchronously changing authentication credentials of a plurality of domains comprising detecting an authentication credential change event for a particular domain, where the authentication credential is being changed from a first credential to a second credential, determining whether the particular domain is within a domain group, and, if the particular domain is within the domain group, changing the authentication credential of at least one other domain in the domain group from the first credential to the second credential.

16 Claims, 3 Drawing Sheets

METHOD AND APPARATUS FOR SYNCHRONIZING UPDATES OF AUTHENTICATION CREDENTIALS

BACKGROUND OF THE INVENTION

1. Field of the Invention

Embodiments of the present invention generally relate to authentication credential management techniques and, more particularly, to a method and apparatus for synchronizing updates of authentication credentials across a plurality of domains.

2. Description of the Related Art

In many computing environments, a user must utilize authentication credentials to access each available web service within a particular environment. Such environments include business enterprises, walled gardens, and the like. The services provided within these environments are exposed as distinct services to network users, i.e., each service is presented within a different domain. Consequently, within a single business enterprise, a user may be required to use a different password for each domain, e.g., accounting, human resources, various projects, various departments, and so on. Within each of these domains, there may be a plethora of dependent services that also utilize various authentication credentials, e.g., user name and password combinations. To provide organization to the authentication credentials, these disparate web services are often linked together to a common authentication source such as an authentication credential directory.

To assist a user in remembering the numerous authentication credentials, a user typically utilizes a browser password manager that accesses the authentication credential directory. Browser password managers typically use a server address or a service's uniform resource locator (URL) (herein referred to as a domain address or domain) as a unique identifying attribute when storing authentication credentials related to each particular domain. When a password in one of these directories has been changed, the entries for all dependent services need to be changed as well. Currently, as each website is visited for the first time after a password change, the stored copy of the password (usually concealed) will fail and need to be updated. In some enterprises, this updating process may require accessing a large number of servers and updating the password information in each server. This is time-consuming and an inefficient use of enterprise resources.

Therefore, there is a need in the art for synchronizing updates of authentication credentials across domains.

SUMMARY OF THE INVENTION

Embodiments of the present invention comprise a method and apparatus for synchronously changing authentication credentials of a plurality of domains comprising detecting an authentication credential change event for a particular domain, where the authentication credential is being changed from a first credential to a second credential, determining whether the particular domain is within a domain group, and, if the particular domain is within the domain group, changing the authentication credential of at least one other domain in the domain group from the first credential to the second credential.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
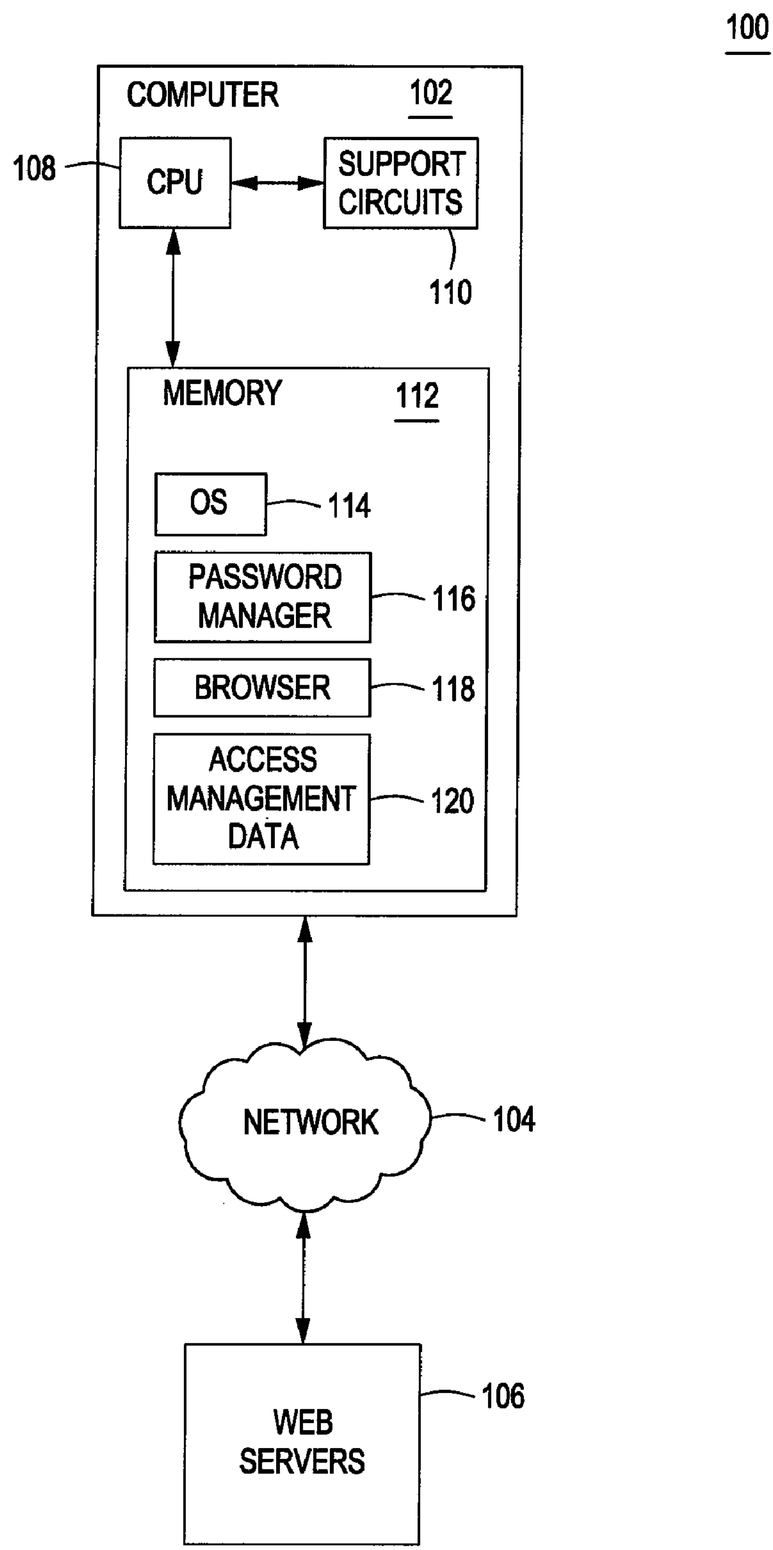
FIG. 1 depicts a block diagram of a computer system comprising one embodiment of the present invention.

FIG. 1 depicts a computer system 100 comprising a computer 102 coupled to at least one web server 106 via a network 104. The web server 106 is any form of server that supplies resources to computers connected to a network where the services are available through a web address, server address, Internet-Protocol (IP) address or unified resource locator (URL) (collectively referred to herein as a domain or domain address). Although a single server is shown for simplicity, a typical computer system comprises a plurality of such servers. The web server 106 is coupled to a network 104. The network 104 comprises a commonly known communications network for distributing digital information including wide-area networks, local-area networks, wireless networks, and the like.

The computer 102 may be one of any type of computing device that can access a web server and utilizes a password manager for managing authentication credentials. Such computing devices include laptop computers, desktop computers, personal digital assistants, cellular telephones, and the like. The computer 102 comprises a central processing unit 108, support circuits 110, and a memory 112. The CPU 108 may be one or more of commercially available processors, microprocessors, microcontrollers, or combinations thereof. The support circuits 110 are well-known circuits and devices that facilitate operation of the CPU 108. The support circuits 110 may comprise such well-known circuits and devices as clock circuits, cache, power supplies, BUS circuits, peripheral drivers, and the like. The memory 112 may be any type of memory used for storing digital information such as magnetic memory, optical memory, or semiconductor memory. The memory 112 stores an operating system 114, a password manager 116, a browser 118, and access management data 120. The operating system may be one of any number of commercially available operating systems that facilitate operation of the computer 102. The browser 118 may be any one of a number of commercially available browsers including Firefox, Safari, Explorer, and the like. The password manager 116 is utilized when the browser accesses a web server requiring authentication credentials such as a password. Typically, the password manager upon being notified that a password is being entered, displays a pop-up input box asking the user whether they desire the password manager to remember the authentication credentials being entered to access the particular web server. The password manager 116 will then store the credentials and domain that is associated with that user name and password as access management data 120. Upon returning to that particular domain, the password manager will automatically enter the authentication credentials associated with that domain that is stored within the access management data 120. In this manner, a user does not have to remember every password that is used to access various domains.

As described below with reference to FIGS. 2 and 3, the password manager associates a user name and password with a group of domains to facilitate synchronized password updating when a password is changed for a domain within the group.

Figure 2:
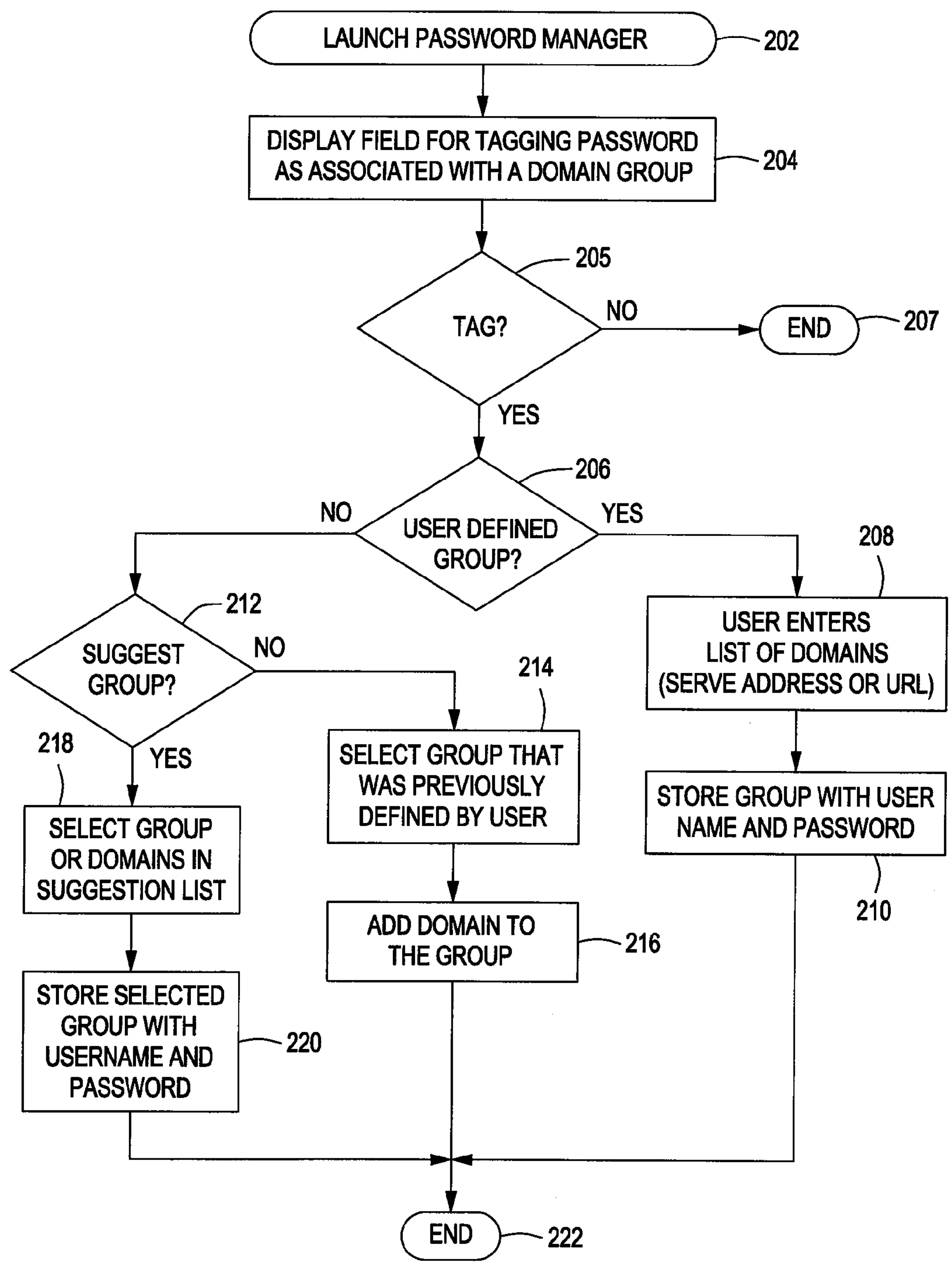
FIG. 2 depicts a flow diagram of a method for associating an authentication credential with a group of domains in accordance with one embodiment of the present invention.

FIG. 2 depicts a flow diagram of a method 200 for associating passwords with groups of domains. The password manager is launched at step 202 upon authentication credentials being entered via a browser to access a web server. At step 204, in addition to asking the user whether they desire the password manager to store the authentication credentials related to the particular domain, the method 200 additionally displays a field for tagging the credentials as associated with a domain group. As such, if the user is accessing a domain within a desired domain group, they may tag the authentication credentials as being associated with that particular group. This is generally implemented as a check box or a button within the displayed interface. At step 205, the method 200 queries whether a tag was established. If no tag, the method 200 ends at step 207. If the credentials have been tagged, the method 200 proceeds to step 206.

At step 206, the user is queried whether the group is to be user-defined. If the query is affirmatively answered, the method 200 proceeds to step 208 where the user enters a list of domains (server addresses or URLs) that identify the particular web servers that are within the group. At step 210, the method 200 stores the group of domain names with their authentication credentials as access management data. The method ends at step 222.

If the user does not desire to define a group at step 206, the query is negatively answered, and the method proceeds to step 212. At step 212, the method queries whether the user would desire the password manager to suggest a group to be associated with the credentials. If the user does not desire a suggestion, the method proceeds to step 214 where in the user can select a group that has been previously defined by the user. A particular group may already exist, and access to the web server is being added to a previously defined group. At step 216, the domain is added to the preexisting group that is associated with the particular password and user name that has been entered to launch method 200. The method 200 ends at step 222.

If the user requested a suggestion to be provided at step 212, the method proceeds to step 218. The user can then select a group or a specific domain in a suggestion list. The suggestion list is created from various heuristics regarding web pages and domains that have been visited previously by the user or a commonality of websites that are typically used by the user. Such heuristic use and/or commonality analysis to define related websites is well known by those that are skilled in the art. At step 220, the method 200 stores the selected group with their related authentication credentials. At step 222, the method ends.

Steps 218 and 220 may be considered optional such that the user may enter a list of domains or select a previously defined list of domains that are within a group and not have an option to utilize suggested groups.

At step 205, the method 200 queries whether the password has been tagged to be associated with a domain group. If the password has not been tagged, the method 200 ends at step 222. If the password has been tagged, the method proceeds to step 206 to define the group that is to be associated with the password.

Figure 3:
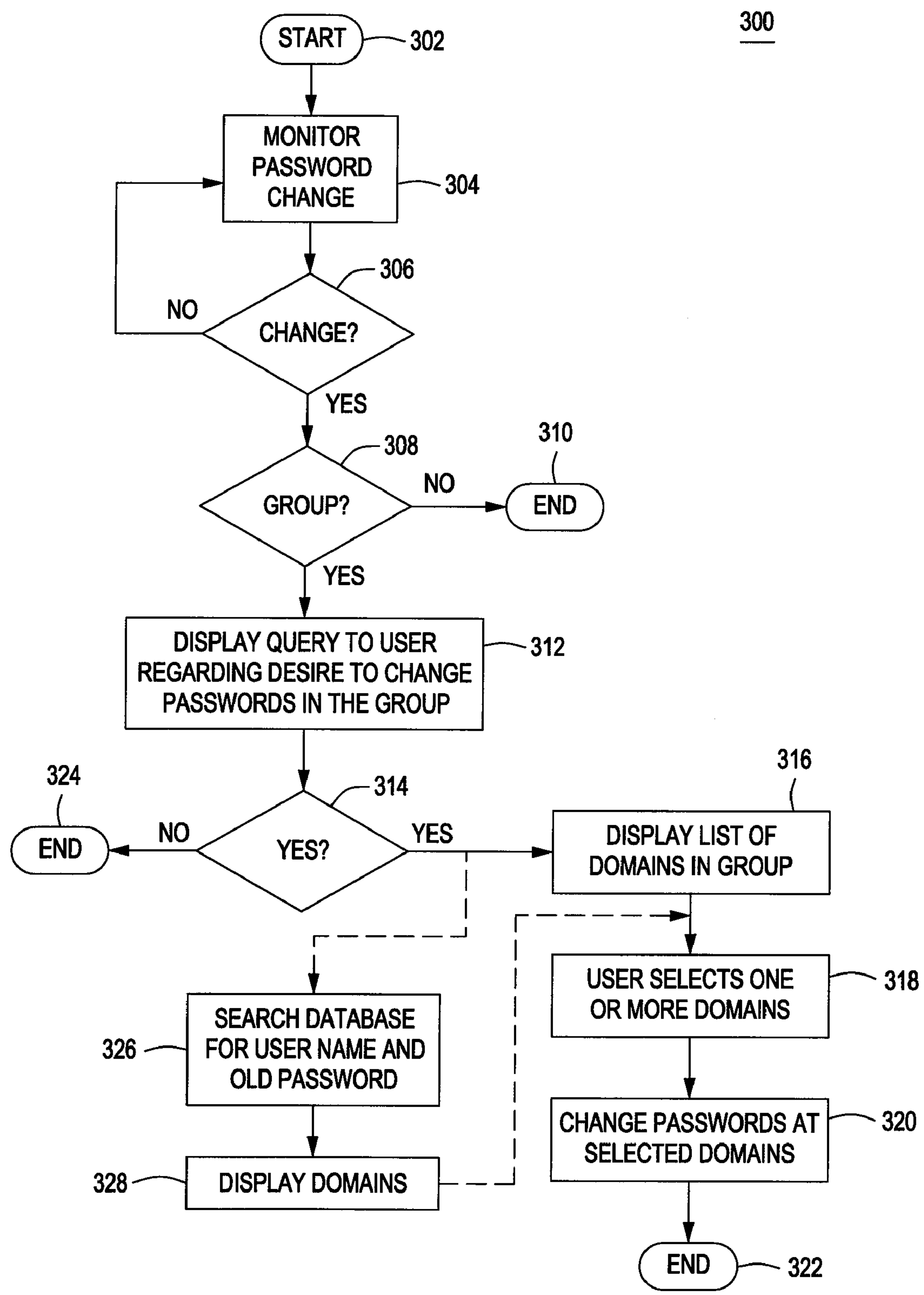
FIG. 3 depicts a method for synchronizing authentication credentials within a group in accordance with one embodiment of the present invention.

FIG. 3 depicts a flow diagram of a method 300 for synchronously updating authentication credentials such as passwords. The method begins at step 302 and proceeds to step 304 wherein the method 300 monitors communications to websites for a password change to occur i.e., an authentication credential change event. At step 306, the method 300 queries whether a change has been detected. If no change has been detected, the method continues to monitor for a password change. If a password change occurs where a user has been displayed either a request by a web server to change a password because the password has become old or the user manually changes a password at a domain, the method 300 will proceed from step 306 to step 308. At step 308, the method queries whether the domain having its password changed is within a group. If the domain is not within a group, the method 300 ends at step 310.

If the domain is within a group as previously defined by the user, the method 300 displays a query to the user regarding the desire to change passwords in the entire group or a subset of the group. At step 314, the method queries whether the user has selected "yes" or "no" to the request for changing the passwords in the group. If the user has selected "no", then the method 300 ends at step 324.

If the user affirmatively expresses the desire to change the passwords in the group, the method proceeds to step 316. At step 316, a list of the domains in the group is displayed to the user. At step 318, the user selects one or more of the domains to have the passwords updated. This may include an update all selection box or button as well for the user to update all of their domains that are in the group. Alternatively, the user may select using a pull-down list or check boxes to identify the particular domains that the user wishes to have the password updated. At step 320, the passwords are changed in the selected domains using the standard procedures for automatically accessing web servers and updating the passwords. The method 300 ends at step 322 after the passwords of the selected domains have been updated.

In an alternative embodiment of the invention, after the user has indicated that the user desires a domain group to be updated with the new password, the user may select to have the password management data searched for the user name and old password combination. By searching for the user name and old password combination, the password manager identifies the domains that utilize the authentication credentials that is being changed. These domains are displayed at step 328. Once displayed, the user may select one or more of the domains to update with the new password at step 318, and the passwords are updated at step 320.

In this manner, the user may identify groups of domains to use the same password and update those password synchronously by entering a single new password and having the password manager automatically update the passwords within the domains of the group by accessing and updating the passwords of those web servers.

While the foregoing is directed to embodiments of the present invention, other and further embodiments of the invention may be devised without departing from the basic scope thereof, and the scope thereof is determined by the claims that follow.

What is claimed is:

1. A method of synchronously changing authentication credentials of a plurality of domains comprising:

detecting an authentication credential change event for a particular domain, where the authentication credential is being changed from a first credential to a second credential;

determining whether the particular domain is within a domain group;

if the particular domain is within the domain group, displaying at least one other domain that utilizes the first credential within the domain group;

selecting at least one domain from the displayed at least one other domain; and changing the authentication credential of the at least one other domain in the domain group from the first credential to the second credential based at least in part on a query to determine whether to change the authentication credential.

2. The method of claim 1 further comprising defining the domain group using a domain selection menu.

3. The method of claim 1 further comprising defining the domain group using heuristics or web site commonality analysis.

4. The method of claim 1 wherein the determining step comprises searching a database of authentication credentials to find domains having identical authentication credentials and defining the found domains as the domain group.

5. The method of claim 1 wherein the changing step comprises automatically accessing at least one domain and changing the authentication credential to the second credential.

6. A method of synchronously changing authentication credentials of a plurality of domains comprising:

associating an authentication credential with a plurality of domains, where the plurality of domains form a domain group;

detecting an authentication credential change event for a particular domain, where the authentication credential is being changed from a first credential to a second credential;

determining whether the particular domain is within the domain group;

if the particular domain is within the domain group, displaying at least one other domain that utilizes the first credential within the domain group;

selecting at least one domain from the displayed at least one other domain; and changing the authentication credential of the at least one other domain in the domain group from the first credential to the second credential based at least in part on a query to determine whether to change the authentication credential.

7. The method of claim 6 further comprising defining the domain group using a domain selection menu.

8. The method of claim 6 further comprising defining the domain group using heuristics or web site commonality analysis.

9. The method of claim 6 wherein the determining step comprises searching a database of authentication credentials to find domains having identical authentication credentials and defining the found domains as the domain group.

10. The method of claim 6 wherein the changing step comprises automatically accessing at least one domain and changing the authentication credential to the second credential.

11. A method of synchronously changing authentication credentials of a plurality of domains comprising:

upon an authentication credential being entered for access to a domain, presenting an interface through which the domain is selectably added to at least one other domain to form a domain group, wherein the domain group is formed by at least one of suggested domains or user defined domains, and further wherein each domain in the domain group utilizes the same authentication credentials and the authentication credentials are tagged to be associated with the domain group;

detecting an authentication credential change event for a particular domain, where the authentication credential is being changed from a first credential to a second credential;

determining whether the particular domain is within the domain group; and if the particular domain is within the domain group, changing the authentication credential of at least one other domain in the domain group from the first credential to the second credential.

12. The method of claim 11 wherein the interface comprises a button or check box to identify the authentication credentials and domain as a member of a group.

13. The method of claim 11 further comprising defining the domain group using a domain selection menu.

14. The method of claim 11 further comprising defining the domain group using heuristics or web site commonality analysis.

15. An apparatus comprising at least one computer processor for synchronously changing authentication credentials of a plurality of domains comprising:

an interface presented via the at least one computer processor through which a domain is selectably added to at least one other domain to form a domain group, wherein the domain group is formed by at least one of suggested domains or user defined domains, wherein each domain in the domain group utilizes the same authentication credentials and the authentication credentials are tagged to be associated with the domain group, wherein an authentication credential change event is detected for a particular domain, where an authentication credential of the authentication credentials is changed from a first credential to a second credential used to access the particular domain, wherein the processor determines whether the particular domain is within the domain group, wherein if the particular domain is within the domain group, the processor changes the authentication credential of at least one other domain in the domain group from the first credential to the second credential.

16. The apparatus of claim 15 wherein the interface comprises a button or check box to identify the authentication credentials and domain as a member of a group.

* * * * *